United States Patent
Huot-Marchand et al.

(10) Patent No.: US 12,297,863 B2
(45) Date of Patent: May 13, 2025

(54) ROLLING BEARING COMPRISING AT LEAST A SENSORIZED AXIAL ROLLING ELEMENT, MACHINE COMPRISING SAID BEARING A PROCESS FOR CONTROLLING SAID MACHINE

(71) Applicant: Aktiebolaget SKF, Gothenburg (SE)

(72) Inventors: Marie-Joelle Huot-Marchand, Diges (FR); Bruno Capoldi, Charentenay (FR)

(73) Assignee: Aktiebolaget SKF, Gothenburg (SE)

( * ) Notice: Subject to any disclaimer, the term of this patent is extended or adjusted under 35 U.S.C. 154(b) by 119 days.

(21) Appl. No.: 18/111,838

(22) Filed: Feb. 20, 2023

(65) Prior Publication Data
US 2023/0287933 A1    Sep. 14, 2023

(30) Foreign Application Priority Data

Mar. 14, 2022  (DE) .......................... 102022202489.3

(51) Int. Cl.
*F16C 19/52*    (2006.01)
*F16C 19/38*    (2006.01)

(52) U.S. Cl.
CPC .......... *F16C 19/522* (2013.01); *F16C 19/381* (2013.01); *F16C 2233/00* (2013.01); *F16C 2352/00* (2013.01)

(58) Field of Classification Search
CPC ...... F16C 19/381; F16C 19/52; F16C 19/522; F16C 19/525; F16C 19/527
See application file for complete search history.

(56) References Cited

U.S. PATENT DOCUMENTS

| | | | |
|---|---|---|---|
| 9,638,258 B2 * | 5/2017 | Niarfeix | F16C 41/007 |
| 10,082,178 B2 | 9/2018 | Dop | |
| 2018/0340575 A1 | 11/2018 | Ziegler | |
| 2022/0243765 A1 * | 8/2022 | Capoldi | F16C 19/381 |

FOREIGN PATENT DOCUMENTS

| | | |
|---|---|---|
| EP | 2354578 B1 | 8/2010 |
| EP | 2851575 B1 | 5/2016 |

* cited by examiner

*Primary Examiner* — James Pilkington
(74) *Attorney, Agent, or Firm* — GARCIA-ZAMOR INTELLECTUAL PROPERTY LAW, LLC; Ruy Garcia-Zamor

(57) ABSTRACT

A rolling bearing comprising a first ring, a second ring, at least one row of rolling elements arranged between axial raceways provided on the rings, at least one plate bearing against one of the first and second rings to close the bearing. At least one of the rolling elements is a sensorized rolling element. At least one through-window is made in the axial thickness of the at least one plate. The rolling bearing further comprises at least one antenna facing the at least one window.

17 Claims, 2 Drawing Sheets

ROLLING BEARING COMPRISING AT LEAST A SENSORIZED AXIAL ROLLING ELEMENT, MACHINE COMPRISING SAID BEARING A PROCESS FOR CONTROLLING SAID MACHINE

CROSS-REFERENCE TO RELATED APPLICATIONS

This application claims priority to and benefit of the following German patent application: DE 102022202489.3, filed Mar. 14, 2022; which is hereby incorporated by reference in its entirety as if fully set forth herein.

BACKGROUND

The present invention relates to the field of rolling bearings.

The invention notably relates to the field of large-diameter rolling bearings having an inner ring and an outer ring arranged concentrically about an axis of rotation running in an axial direction.

Such large-diameter rolling bearings may be used for example in a tunnel boring machine, in a mining extraction machine or in a wind turbine. The bearing can be in a closed system due to oil lubrication constraints.

SUMMARY

A large-diameter rolling bearing comprises two concentric inner and outer rings, and several rows of axial and radial rollers arranged between the rings. The rows of axial and radial rollers are arranged between a nose provided on the inner or outer ring which is named "nose ring", and a groove formed on the other ring. The rolling bearing further comprises cages for maintaining the row of axial rollers and radial rollers. Each cage can be either in one part or segmented. For example, it is possible to refer to EP-B1-2 851 575.

In order to allow the monitoring of the bearing, at least one of the rows of rollers may comprise at least a sensorized roller.

However, due to the bearing size and metallic nature, heavy interference or blocking of electromagnetic waves is to be expected, which could be problematic for a wireless communication with the sensorized axial roller.

Besides, in some cases, the rolling bearing can be installed in the machine assembly in such a way that the sensorized roller is shielded from any electromagnetic interaction through Faraday cage effect.

Consequently, the sensorized roller is unable to communicate data wirelessly outside of the bearing.

One aim of the present invention is to overcome these drawbacks.

The invention relates to a rolling bearing comprising a first ring, a second ring, at least one row of rolling elements arranged between raceways provided on the said rings, and at least one plate bearing against one of the first and second rings to close said bearing. The at least one plate is secured to said ring. The signal will be able to go through the plate.

The terms "axial rolling elements" is understood to mean rolling elements adapted to accommodate axial loads. The terms "radial rolling elements" is understood to mean rolling elements adapted to accommodate radial loads.

According to a general feature of the invention, at least one of the rolling elements is a sensorized rolling element.

The at least one sensorized rolling element is preferably an axial rolling element. Alternatively, the at least one sensorized rolling element is a radial rolling element.

According to another general feature of the invention, at least one through-window is made in the axial thickness of the at least one plate.

According to another general feature of the invention, the rolling bearing further comprises at least one antenna facing said at least one window.

In on embodiment, the rolling bearing comprises at least one row of radial rolling elements arranged between axial raceways provided on the said rings, and at least row of axial rolling elements arranged between radial raceways provided on said rings. One of the axial rolling elements is the sensorized rolling element. In one embodiment, the rolling bearing comprises first and second plates each axially bearing against one of the first and second rings to close said bearing, each plate being secured to said ring.

Preferably, the rolling bearing further comprises at least one seal mounted on one of the first and second rings and bearing against the other ring. Said through-window made in the axial thickness of said plate axially faces at least partly said seal.

The rolling bearing may comprise at least two antennas facing said at least one through-window. Said two antennas may form an angle comprised between 450 and 900 so as to get the best signal receipt, another position would reduce the quality but not complete avoid it.

In on embodiment, a plurality of through-windows may be made in the axial thickness of said plate, the through-windows being spaced in the circumferential direction.

The invention also relates to a machine comprising an external device, a rolling bearing as described above and a rotating machine transmitting rotational movement to the external device through said rolling bearing, the machine also comprising computers configured to receive data from the rolling bearing and command the rotating machine.

The signal generation and transmission can be initiated by said sensorized rolling element of the rolling bearing, or by an application-specific integrated circuit or by an integrated circuit.

The external device can be a cutting head of a tunnel boring machine or any other rotating machine.

The invention further relates to a process for controlling a machine as described above comprising the following steps: receiving measurements from said sensorized rolling element of the rolling bearing, and determining a speed setpoint for the rotating machine through a machine driver interface based on the measurement received, and a predetermined model. In that way a real time machine performance adjustment could be achieved.

Measurement data can comprise least the sensorized rolling element rotation speed and the normal load.

The setpoint can be transmitted either as operator instructions or as instructions for an onboard electronic command unit.

The process can further comprise determining a residual lifetime of the rolling bearing based on the received measurements and calculate the corresponding lifetime share already consumed.

The process can further comprise determining operating parameters for the machine based on the measurement received and a predetermined model, and determining requirements for an improved rolling bearing based on the operating parameters, determining the location of the most loaded area, and determining the load measured at bearing compared to the ones estimated at early stage.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Other advantages and features of the invention will appear from the detailed description of embodiment of the invention, which are non-limiting example, illustrated on the appended drawing of which.

DETAILED DESCRIPTION OF THE PRESENT INVENTION

Figure 1:
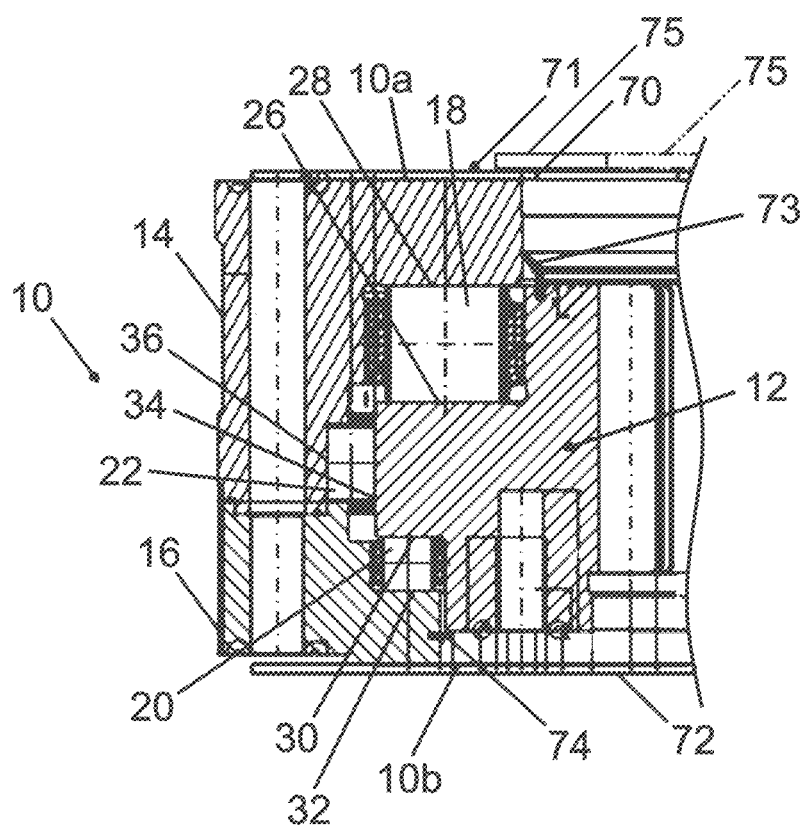
FIG. 1 is a partial cross-section of a rolling bearing according to an example of the invention.

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the invention. The terms "touching," "abutting," "against," and "contacting" when used in connection with two surfaces is defined as meaning "being positioned anywhere between actual touching of two surfaces to being in facing orientation and within 1 inch (or 2.54 centimeters) apart." Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language "at least one of 'A', 'B', and 'C'," as used in the claims and in corresponding portions of the specification, means "any group having at least one 'A'; or any group having at least one 'B'; or any group having at least one 'C'; —and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

The rolling bearing as illustrated on FIG. 1 is a large-diameter rolling bearing comprising a first ring 10 and a second ring 12. In the illustrated example, the first ring 10 is the outer ring whereas the second ring 12 is the inner ring. In this example, the inner ring 12 is a rotative ring and the outer ring 10 is a non-rotative ring. The rolling bearing may for example be used in a tunnel boring machine, a wind turbine, excavators, stacker or reclaimer, in a ladle turret for liquid steel handling, a thruster or pod thruster, turret or turntable buoy or any other applications using a large diameter rolling bearing.

The outer and inner rings 10, 12 are concentric and extend axially along the bearing rotation axis (not shown) which runs in an axial direction. In the illustrated example, the rings 10, 12 are of the solid type.

The outer ring 10 is formed as a split ring and comprises a first supporting ring 14 and a second retaining ring 16 stacked one relative to the other in the axial direction. Each of the supporting and retaining rings 14, 16 of the outer ring is provided with a plurality of aligned through-holes (not referenced) in order to be joined by fitting bolts.

The outer ring 10 comprises two opposite radial frontal faces 10a, 10b which delimit the axial thickness the ring. The frontal face 10a is formed on the supporting ring 14 while the frontal face 10b is formed on the retaining ring 16.

In the illustrated example, the rolling bearing comprises two rows of rolling elements 18, 20 which are arranged between the outer and inner rings 10, 12 in order to form an axial thrust, and a row of radial rollers 22 which are arranged between said rings to form a radial thrust. At least one of the rollers 18 is a sensorized roller.

The rollers 18, 20, 22 of one row are identical to one another. Each roller 18, 20, 22 comprises a cylindrical outer rolling surface. The axis of rotation of each roller 22 is parallel to the axis of the bearing and perpendicular to the axes of each of the rollers 18, 20

The rollers 18 are arranged axially between annular radial raceways 26, 28 respectively formed on the inner and outer rings 12, 10. The radial raceway 28 is formed on the supporting ring 14 of the outer ring. The raceways 26, 28 face each other in the axial direction.

The rollers 20 are arranged axially between annular radial raceways 30, 32 respectively formed on the inner and outer rings 12, 10. The raceways 30, 32 axially face each other. The rows of rollers 18 and the row of rollers 20 are spaced apart from each other in the axial direction.

The rollers 22 are arranged radially between annular axial raceways 34, 36 respectively formed on the inner and outer rings 12, 10. The radial raceway 36 is formed on the supporting ring 14 of the outer ring. The raceways 34, 36 face each other in the radial direction. The row of rollers 22 is radially offset outwards with respect to the rows of rollers 18, 20. The row of rollers 22 is axially located between the rows of rollers 18, 19, 20.

In the described examples, the slewing bearing is provided with three rows of rolling elements. Alternatively, the slewing bearing may comprise only one or two rows of rolling elements, or four rows or more of rolling elements. In the illustrated example, the rolling elements are rollers. The slewing bearing may comprise other types of rolling elements, for example balls.

Figure 2:
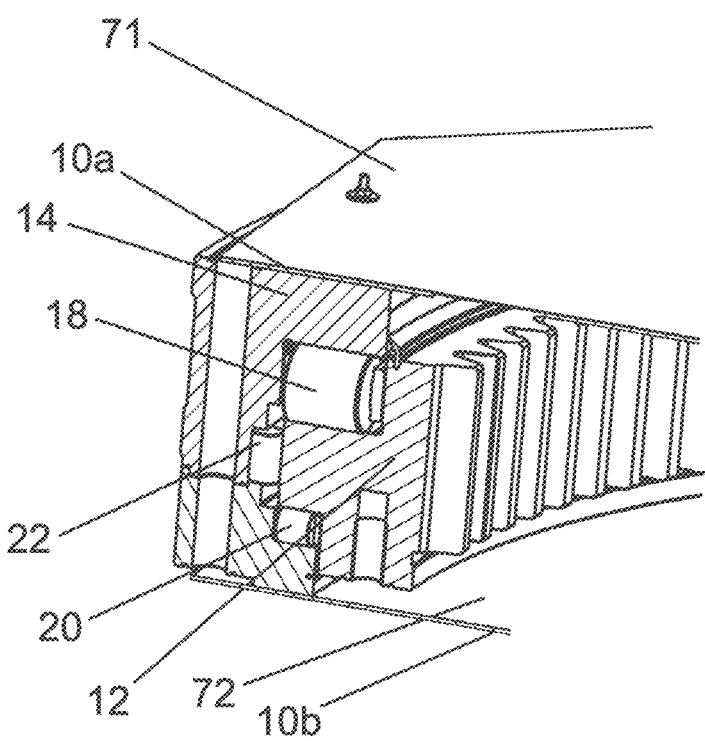
FIG. 2 is a partial perspective view of the rolling bearing of FIG. 1.

As shown on FIG. 2, the rolling bearing further comprises first and second plates 71, 72 axially bearing against the outer ring 10 to close the bearing. The first plate 71 axially bearing against the frontal face 10*a* of the outer ring. The second plate 72 axially bearing against the frontal face 10*b* of the outer ring. The first and second plates 71, 72 are secured to the outer ring. In the illustrated example, the rolling bearing is provided with the first and second plates 71, 72. Alternatively, the rolling bearing may be provided with only one of these first and second plates 71, 72.

The rolling bearing further comprises on each side an annular seal 73, 74 provided to close the radial space that exists between the rings 10, 12. A closed space (not referenced) is defined between the outer and inner rings 10, 12 and the seals 73, 74 in which the rows of rollers 18, 20 and 22 are housed. In the illustrated example, the seal 73 is mounted on the inner ring 12 and comes into contact with the outer ring 10, and the seal 74 is mounted on the outer ring 10 and comes into contact with the inner ring 12. Each seal 73, 74 is made in nitrile or polyurethan. Alternatively, the seals 73, 74 may have different designs. In another variant, it could be possible to not foresee such seals.

Figure 3:
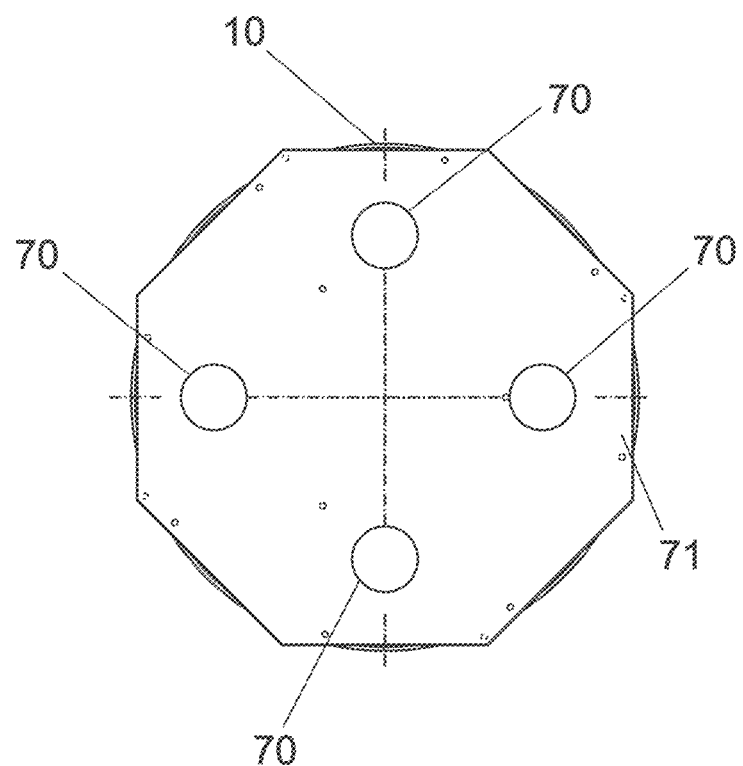
FIG. 3 is a front view of the rolling bearing of FIGS. 1 and 2, and FIG. 4 schematically represents the main parts of a Tunnel Boring Machine comprising the rolling bearing of FIGS. 1 to 3.

As shown in FIGS. 1 and 3, through-windows 70 are formed on the first plate 71. Each through-window 70 is made in the axial thickness of the first plate 71. Each through-window 70 extends axially through the first plate 71. In FIG. 2, the through-window 70 are not represented.

In the illustrated example, the first plate 71 comprises a plurality of through-windows 70 regularly spaced in the circumferential direction. The through-windows 70 are provided on the same diameter. The through-windows 70 are located at position allowing access to the signal of the sensorized roller 18. The through-windows 70 axially face at partly the seal 73 provided between the outer and inner rings 10, 12. As a matter of fact, the material of the seal 73 allows signal transmission. The through-windows 70 are radially offset inwards with regard to the row of axial rollers 18.

The rolling bearing also comprises at least one antenna 75, said antenna 75 axially facing one through-window 70. The antenna is secured to the first plate 71 by any appropriate means. The antenna is secured to the first plate 71 axially on the side opposite the frontal face 10*a* of the outer ring. The antenna extends along the first plate 71. If the rolling bearing comprises a plurality of antennae, each antenna 75 axially faces one of the through-window. FIG. 1 shows an additional, optional antenna 75 in dot-dot-dash lines.

The sensorized axial roller 18 is able to communicate data wirelessly thanks to the window 70 and antenna.

In the illustrated example, the first plate 71 comprises four through-windows 70. Alternatively, a different number of through-window 70 may be provided, for example one, two, three or more than four. A combination between number and size of through-windows can be determined so as to fit application requirements and constraints.

Similarly, multiple antennas per window can improve reception, in particular when used together. When using multiples antennas per window, different positions around the window can be used to further improve reception. In particular, when using two antennas, two antennas can be installed with a 450 or a 900 angle.

Figure 4:
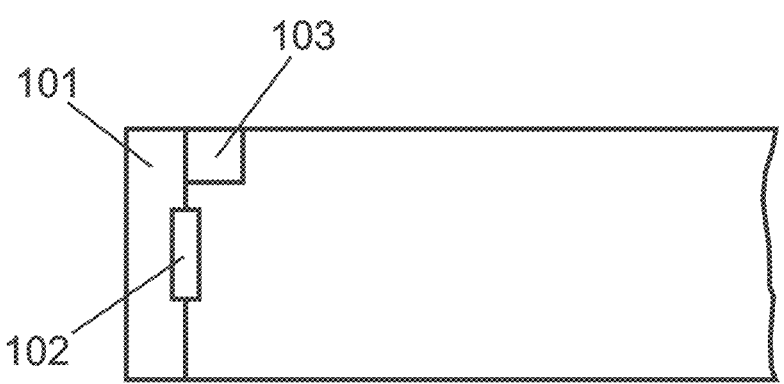

FIG. 4 schematically illustrates a Tunnel Boring Machine (TBM), comprising a cutting head 101, a slewing bearing according to the invention 102 and a rotating machine 103. A control center houses remote computers allowing for control of the TBM, notably the rotating machine. The control center can be located either locally or remotely.

In a first embodiment, the sensorized, e.g. axial, roller 18 transmit measurement data wirelessly to the remote computers. Measurement data may comprise at least the axial roller rotation speed, the load level at roller most loaded point, the acceleration, and the temperature. The remote computers host software for a machine driver interface that determines a speed setpoint for the TBM rotating machine 103, which is sent back to the TBM. It can be sent back as instructions for the TBM operators or directly as a setpoint for an onboard electronic command unit.

The TBM speed can thereby be adjusted in real-time for increased performance.

In another embodiment, the machine driver interface can also determine a residual lifetime of the bearing based on measurement data received from the sensorized axial rolling elements.

In a third embodiment of the invention, the machine driver interface determines operating parameters for the TBM. Said operating parameters are then used within a modelling software, thanks to which a new bearing can be designed based on the determined operating parameters.

With more accurate understanding of the loads applied to the bearings, the TBM design can be improved, notably by adjusting dimensions, dimensional ratios, actuators power, etc. By comparison, the loads are currently estimated through a gear box dimensioning. However, that kind of estimation lacks precision.

Finally, depending on the embodiments, the remote computers can be integrated in the sensorized axial rolling element, on an ASIC (Application-Specific Integrated Circuit) or IC (acronym for Integrated Circuit).

The invention claimed is:

1. A rolling bearing comprising a first ring, a second ring, at least one row of rolling elements arranged between raceways provided on the said rings, and at least one plate bearing against one of the first and second rings to partially cover said bearing, characterized in that at least one of the rolling elements is a sensorized rolling element, and in that at least one through-window is made in the axial thickness of the at least one plate, the rolling bearing further comprising at least one antenna facing said at least one through-window.

2. The rolling bearing according to claim 1, further comprising at least one seal mounted on one of the first and second rings and bearing against the other ring, said at least one through-window axially facing at least a portion of said seal.

3. A rolling bearing according to claim 2, comprising at least two antennas facing said at least one through-window.

4. A rolling bearing according to claim 2, wherein the at least one through-window comprises two or more through-windows made in the axial thickness of said plate, the through-windows being spaced in the circumferential direction.

5. The rolling bearing according to claim 1, comprising at least two antennas facing said at least one through-window.

6. A rolling bearing according to claim 5, wherein the at least one through-window comprises two or more through-windows made in the axial thickness of said plate, the through-windows being spaced in the circumferential direction.

7. The rolling bearing according to claim 1, wherein the at least one through-window comprises two or more through-windows made in the axial thickness of said plate, the through-windows being spaced in the circumferential direction.

8. A machine comprising an external device, a rolling bearing according to claim 7 and a rotating machine transmitting rotational movement to the external device through said rolling bearing, the machine also comprising computers configured to receive data from the rolling bearing and command the rotating machine.

9. The machine according to claim 8, wherein signal generation and transmission is initiated by said sensorized axial rolling element of the rolling bearing, or by an application-specific integrated circuit or by an integrated circuit.

10. The machine according to claim 9, wherein the external device is a cutting head of a tunnel boring machine or a rotatable machine.

11. The machine according to claim 8, wherein the external device is a cutting head of a tunnel boring machine or a rotatable machine.

12. A process for controlling a machine according to claim 11 comprising the following steps:
receiving measurements from said sensorized axial rolling element of the rolling bearing,
determining a speed setpoint for the rotating machine through a machine driver interface based on the measurement received, and a predetermined model.

13. A process for controlling a machine according to claim 9 comprising the following steps:
receiving measurements from said sensorized axial rolling element of the rolling bearing,
determining a speed setpoint for the rotating machine through a machine driver interface based on the measurement received, and a predetermined model.

14. A process for controlling a machine according to claim 8 comprising the following steps:
receiving measurements from said sensorized axial rolling element of the rolling bearing,
determining a speed setpoint for the rotating machine through a machine driver interface based on the measurement received, and a predetermined model.

15. The process according to claim 14, wherein measurement data comprises at least the sensorized axial rolling element rotation speed and the normal load.

16. The process according to claim 15, further comprising determining a residual lifetime of the rolling bearing based on the received measurements and calculate the corresponding lifetime share already consumed.

17. The process according to claim 14, further comprising determining a residual lifetime of the rolling bearing based on the received measurements and calculate the corresponding lifetime share already consumed.

* * * * *